US008622828B1

(12) United States Patent
Harrington

(10) Patent No.: US 8,622,828 B1
(45) Date of Patent: Jan. 7, 2014

(54) SYSTEM AND METHOD FOR FACILITATING SOCIAL GAMING ACROSS SOCIAL PLATFORMS

(71) Applicant: Clifford J. Harrington, San Francisco, CA (US)

(72) Inventor: Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

(21) Appl. No.: 13/653,284

(22) Filed: Oct. 16, 2012

Related U.S. Application Data

(63) Continuation of application No. 13/343,588, filed on Jan. 4, 2012.

(51) Int. Cl.
*A63F 13/10* (2006.01)
*A63F 13/12* (2006.01)
*G06Q 50/00* (2012.01)
*H04L 12/58* (2006.01)
*H04W 4/20* (2009.01)

(52) U.S. Cl.
CPC ............ *G06Q 50/01* (2012.01); *H04L 51/32* (2013.01); *H04W 4/206* (2013.01)
USPC ............................................ 463/31; 463/42

(58) Field of Classification Search
CPC .............. A63F 2300/5546; A63F 2300/57; A63F 2300/40; A63F 2300/401; G06F 21/128; G06F 21/121; G06F 21/10; G06F 21/31; H04W 12/06; H04W 12/08; H04W 4/206; G06Q 50/01; H04L 15/32; H04L 12/1813; H04N 21/4788
USPC ................... 463/30, 31, 29, 40–42; 715/758; 705/319
See application file for complete search history.

(56) References Cited

U.S. PATENT DOCUMENTS 6,951,516 B1   10/2005   Eguchi et al. ................ 463/40
7,056,217 B1    6/2006   Pelkey et al. ................ 463/43

(Continued)

FOREIGN PATENT DOCUMENTS

EP   2 383 683       11/2011
WO   WO 2013/086268   6/2013

(Continued)

OTHER PUBLICATIONS

Johnston, Ken, VSCpr for GREE, Inc. "GREE Gaming Platform Provides Global User Base for All Developers. New Platform Offers Unified Social Gaming System", Burlingame, CA, PRWeb, Dec. 5, 2011, 2 pages.

(Continued)

*Primary Examiner* — David L Lewis
*Assistant Examiner* — Matthew D. Hoel
(74) *Attorney, Agent, or Firm* — Pillsbury Winthrop Shaw Pittman LLP

(57) ABSTRACT

Participation in an online game through a plurality of different social network platforms may be facilitated. This may include enabling an individual user to log in to the online game, which may take place in a virtual space, through a plurality of different social network platforms, thereby extending the accessibility of the online game with respect to the individual user. The online game may be provided to users through different social network platforms such that a first user accessing the online game through a first social network platform may access a common instance of the online game (and/or the virtual space) with a second user accessing the online game through a second social network platform.

18 Claims, 3 Drawing Sheets

(56) References Cited

U.S. PATENT DOCUMENTS

| | | | |
|---|---|---|---|
| 7,780,530 B2 | 8/2010 | Ushiro et al. | 463/42 |
| 8,137,193 B1* | 3/2012 | Kelly et al. | 463/31 |
| 8,137,194 B1* | 3/2012 | Kelly et al. | 463/31 |
| 8,214,487 B2 | 7/2012 | Savoor et al. | 709/224 |
| 8,257,174 B2* | 9/2012 | Pincus et al. | 463/31 |
| 8,347,225 B2* | 1/2013 | Blinnikka et al. | 715/787 |
| 8,347,322 B1* | 1/2013 | Brown et al. | 719/328 |
| 8,353,760 B2* | 1/2013 | Ocko et al. | 463/25 |
| 2003/0078960 A1* | 4/2003 | Murren et al. | 709/203 |
| 2004/0117386 A1* | 6/2004 | Lavender et al. | 707/100 |
| 2005/0272504 A1 | 12/2005 | Eguchi et al. | 463/40 |
| 2006/0121986 A1 | 6/2006 | Pelkey et al. | 463/40 |
| 2007/0150603 A1 | 6/2007 | Crull et al. | 709/227 |
| 2007/0274460 A1 | 11/2007 | Shaffer et al. | 379/37 |
| 2008/0119277 A1 | 5/2008 | Thelen | 463/42 |
| 2008/0134035 A1* | 6/2008 | Pennington et al. | 715/713 |
| 2008/0187143 A1 | 8/2008 | Mak-Fan | 381/17 |
| 2009/0034696 A1 | 2/2009 | Ramanathan | 379/88.17 |
| 2009/0112989 A1 | 4/2009 | Anderson et al. | 709/204 |
| 2009/0172795 A1 | 7/2009 | Ritari et al. | 726/7 |
| 2009/0197681 A1 | 8/2009 | Krishnamoorthy et al. | 463/42 |
| 2009/0325712 A1 | 12/2009 | Rance | 463/42 |
| 2009/0327232 A1 | 12/2009 | Carter et al. | 707/3 |
| 2009/0327427 A1 | 12/2009 | Mathew et al. | 709/206 |
| 2009/0327882 A1 | 12/2009 | Velusamy | 715/269 |
| 2010/0024015 A1* | 1/2010 | Hardt | 726/6 |
| 2010/0063969 A1 | 3/2010 | Kasargod et al. | 707/740 |
| 2010/0106782 A1 | 4/2010 | Huang et al. | 709/206 |
| 2010/0169798 A1 | 7/2010 | Hyndman et al. | 715/757 |
| 2010/0197409 A1 | 8/2010 | Van Luchene | 463/42 |
| 2010/0216553 A1 | 8/2010 | Chudley et al. | 463/42 |
| 2010/0228617 A1 | 9/2010 | Ransom et al. | 705/14.25 |
| 2010/0229106 A1 | 9/2010 | Lee et al. | 715/757 |
| 2010/0235754 A1 | 9/2010 | Leitheiser | 715/742 |
| 2010/0304862 A1 | 12/2010 | Coleman et al. | 463/32 |
| 2011/0014972 A1 | 1/2011 | Herrmann et al. | 463/25 |
| 2011/0016488 A1 | 1/2011 | Athias | 725/53 |
| 2011/0022450 A1* | 1/2011 | Meredith | 705/14.4 |
| 2011/0107239 A1 | 5/2011 | Adoni et al. | 715/757 |
| 2011/0131508 A1 | 6/2011 | Gershfang et al. | 715/757 |
| 2011/0151976 A1 | 6/2011 | Holloway et al. | 463/42 |
| 2011/0212783 A1* | 9/2011 | Dale et al. | 463/42 |
| 2011/0237335 A1 | 9/2011 | Holloway et al. | 463/42 |
| 2011/0238608 A1 | 9/2011 | Sathish | 706/47 |
| 2011/0250949 A1 | 10/2011 | Van Os et al. | 463/25 |
| 2011/0269548 A1 | 11/2011 | Barclay et al. | 463/42 |
| 2012/0047008 A1 | 2/2012 | Alhadeff et al. | 705/14.16 |
| 2012/0077523 A1 | 3/2012 | Roumeliotis et al. | 455/456.3 |
| 2012/0124147 A1 | 5/2012 | Hamlin et al. | 709/206 |
| 2012/0202587 A1 | 8/2012 | Allen et al. | 463/25 |
| 2012/0290949 A1 | 11/2012 | Elenzil et al. | 715/753 |
| 2013/0014033 A1 | 1/2013 | Hamick et al. | 715/757 |
| 2013/0091221 A1 | 4/2013 | Bennett | 709/204 |
| 2013/0143669 A1 | 6/2013 | Muller | 463/42 |
| 2013/0151604 A1 | 6/2013 | Ranade | 709/204 |
| 2013/0159430 A1 | 6/2013 | Ranade | 709/206 |
| 2013/0172085 A1 | 7/2013 | Harrington | 463/42 |

FOREIGN PATENT DOCUMENTS

| | | |
|---|---|---|
| WO | WO 2013/096261 | 6/2013 |
| WO | WO 2013/103655 | 7/2013 |

OTHER PUBLICATIONS

"Buddy Rush:: The World's Best Cross-platform RPG!", http://buddyrush.sollmo.com/, printed Nov. 28, 2011, copyright 2011 by Team Sollmo with Company 11, Inc., 2 pages.

"FriendFeed", definition from Wikipedia, the free encyclopedia, printed Nov. 28, 2011, 3 pages.

Webster, Andrew, "Social games need to become truly cross-platform", http://www.gamezebo.com/news/2011/06/08/social-qames-need-become-truly-cross-platform, posted Jun. 8, 2011, printed Nov. 28, 2011, 2 pages.

Hendrickson, Mark, "Watch Out FriendFeed: Socialthing! Is Even Easier to Use", http://techcrunch.com/2008/03/10/watch-out-friendfeed-socialthing-is-even-easier-to-use/, posted Mar. 10, 2008, printed Nov. 28, 2011, 2 pages.

* cited by examiner

SYSTEM AND METHOD FOR FACILITATING SOCIAL GAMING ACROSS SOCIAL PLATFORMS

FIELD

The disclosure relates to hosting an online social game in such a manner that individual users may log into the same user account in the social game from a plurality of different social network platforms, and/or such that users that have logged into the social game from different social network platforms can still participate in the social game together.

BACKGROUND

Social online games are known. Typically, users log in to a social online game from a social networking platform. The gaming experience within the social game may be tied into the social networking platform. For example, the user interface of the social game may be presented within the user interface for the social network platform, notifications of the activity of a user may be sent back to the social network platform for presentation, other users that are linked to the user may be recommended for cooperation in the social game, and/or other features may be tied to the social networking platform.

Generally, if a social game is provided for different social networking platforms, then the social game is provided separately to each of the different social networking platforms. As such, in order for a user to participate in the social game from two different social networking platforms, the user must have two separate user accounts for the social game (e.g., one for each social networking platform). If users log in to the social game from different social networking platforms, the typically may not be able to participate in the game with each other, but may be restricted to participation with other users that have logged in through the same social networking platform.

SUMMARY

One aspect of the disclosure relates to a system and method for facilitating participation in an online game through a plurality of different social network platforms. This may include enabling an individual user to log in to the online game, which may take place in a virtual space, through a plurality of different social network platforms, thereby extending the accessibility of the online game with respect to the individual user. The online game may be provided to users through different social network platforms such that a first user accessing the online game through a first social network platform may access a common instance of the online game (and/or the virtual space) with a second user accessing the online game through a second social network platform. This may enable users from different social network platforms to participate in the online game together.

A system that facilitates participation in an online game through a plurality of social network platforms may include one or more servers. The server may be configured to execute computer modules including one or more of a user account module, an authentication module, a social network information module, a notification module, a space module, and/or other modules.

The user account module may be configured to manage user accounts associated with individual users. The user accounts may include a first user account associated with a first user, a second user account associated with a second user, and/or other user accounts.

The first user account may include sets of social network authentication information corresponding to a plurality of social network accounts of the first user on a corresponding plurality of social network platforms. The sets of social network authentication information may include a first set of social network authentication information corresponding to a first social network account of the first user on a first social network platform and a second set of social network authentication information corresponding to a second social network account of the first user on a second social network platform. The second user account may include one or more sets of social network authentication information corresponding to one or more social network accounts of the second user on a corresponding one or more one or more social network platforms. The one or more sets of social network authentication information may include a third set of social network authentication information corresponding to a third social network account of the second user on a third social network platform.

The first user account may include character information for a first character controlled by the first user in the online game. The second user account may include character information for a second character controlled by the second user in the online game. The character information may include one or more of information that defines a visual appearance of the character, a progress level of the character in the online game, a status of the character in the online game, a score of the character in the online game, or an inventory of the character in the online game.

The authentication module may be configured to receive authentication requests submitted by the users through social network platforms, and to authenticate the users in response to the authentication requests. For example, the authentication module is configured such that responsive to receiving a first authentication request submitted by the first user through either of the first social network platform or the second social network platform, the authentication module can authenticate and log in the first user.

Responsive to reception of an authentication request from the first user through the first social network platform, the authentication module may identify the first user based on the inclusion of the first set of social network authentication information in the authentication request. The authentication module may then log the first user into the online game to control the first character. Responsive to receiving an authentication request submitted by the first user through the second social network platform, the authentication module may identify the first user based on the inclusions of the second set of social network authentication information in the second authentication request. The authentication module may then log the first user into the online game to control the first character.

The authentication module may be configured to receive an authentication request from the second user through the third social network platform. Responsive to reception of such a request, the authentication module may identify the second user based on the inclusion of the third set of social network authentication information in the authentication request. The authentication module may then log the second user into the online game to control the second character, thereby enabling the first user and the second user to participate in the online game together even though they have accessed the online game through separate social network platforms.

The social network information module may be configured to receive social network information from the social network platforms about the users. This may include receiving social network information about the first user from the first social network platform and from the second social network platform. The social network information module may further be configured to aggregate social network information for the individual users that is received from the different social network platforms. This may include aggregating the social network information about the first user received from the first social network platform and the second social network platform having a type that is the same or similar, which may thereby represent the first user across both the first social network platform and the second social network platform.

The notification module may be configured to generate notifications to the social network platforms indicating activity by the users in the online game. This may include, responsive to the first user performing an action in the online game that triggers a notification, generating a first notification of the action for the first social network platform and a second notification of the action for the second social network platform. The first notification may cause an indication of the action to be displayed on a virtual wall associated with the first user in the first social network platform. The second notification may cause an indication of the action to be displayed on a virtual wall associated with the first user in the second social network platform.

The space module may be configured to execute an instance of a virtual space in which the online game is played, and to provide view information defining views of the virtual space to client computing devices to facilitate presentation of the views to the users. The space module may be configured such that responsive to the first user and the second user being logged into the online game by the authentication module, the space module (i) may implement the instance of the virtual space to determine view information that defines a first view of the virtual space for presentation to the first user, and a second view of the virtual space for presentation to the second user, and (ii) may transmit the view information to client computing platforms associated with the first user and the second user to facilitate presentation of the first view to the first user, and of the second view to the second user. The space module may be configured such that the first character under control of the first user may be viewable in the second view, and wherein the second character under control of the second user may be viewable in the first view.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
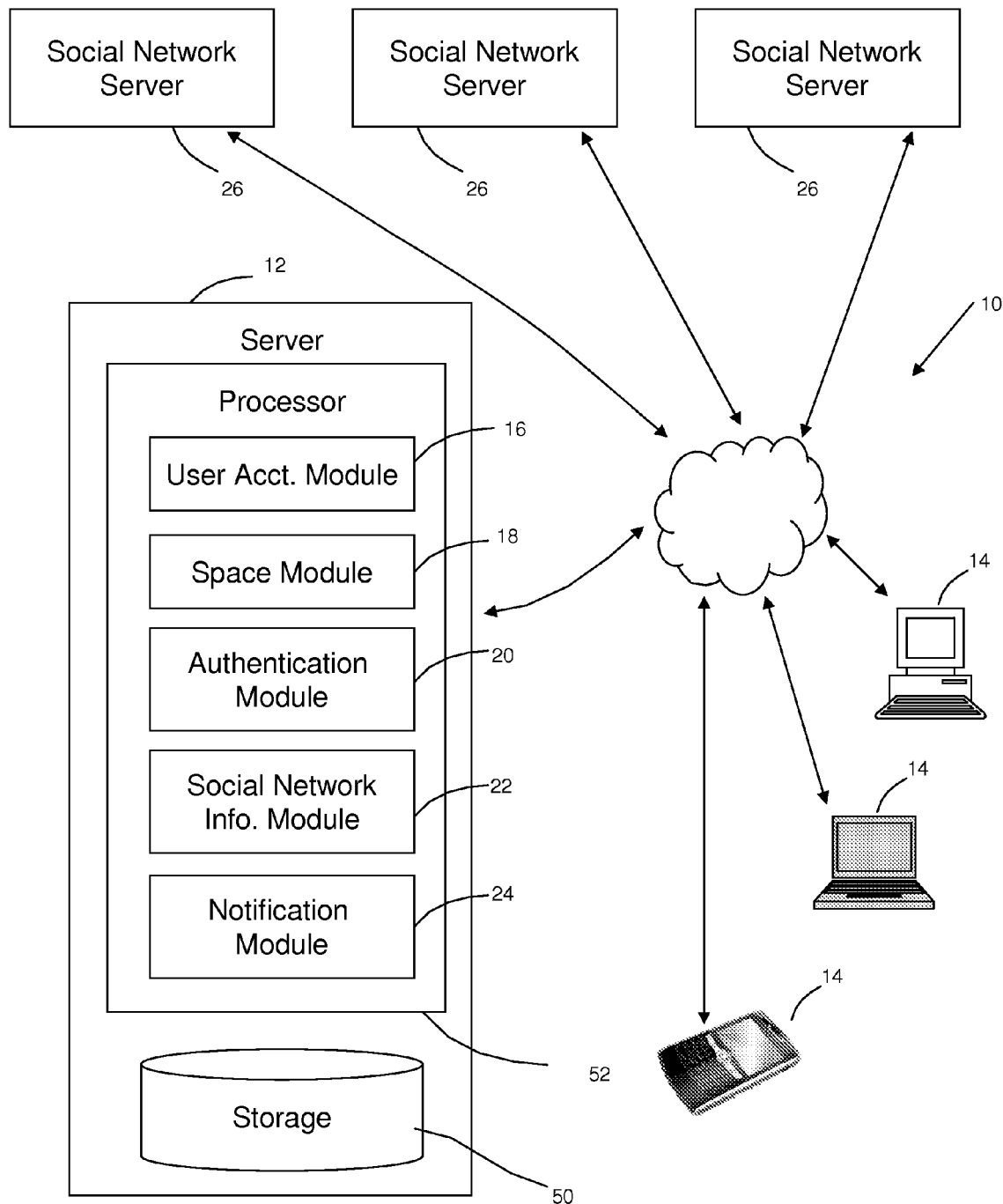
FIG. 1 illustrates a system configured to facilitate play of an online game by users through a plurality of social network platforms.

FIG. 1 illustrates a system 10 configured to facilitate play of an online game by users through a plurality of social network platforms. System 10 may enable users logging into the game from different social network platforms to play with each other in the online game. System 10 may enable an individual user to log in to the same user account for the game from any of a plurality of different social network platforms. In some implementations, system 10 may include a server 12. Server 12 may be configured to communicate with one or more client computing platforms 14 according to a client/server architecture. The users may access system 10 and/or the online game via client computing platforms 14.

Server 12 may be configured to execute one or more computer program modules. The one or more computer program modules may include one or more of a space module 16, a user account module 18, an authentication module 20, a social network information module 22, a notification module 24, and/or other modules.

Space module 16 may be configured to host a virtual space for access by users via client computing platforms 14. The users may participate in the online game within the virtual space. Hosting the virtual space may include executing an instance of the virtual space, and implementing the instance of the virtual space to determine view information representing views of the virtual space. The view information may then be communicated from server 12 to client computing platforms 14 to facilitate presentation of the views to the users. The views may be presented to the users within user interfaces of applications being executed on client computing platforms 14 (e.g., web browsers).

In some implementations, the virtual space (and/or the online game) may be accessed through one of a plurality of different social network platforms provided by one of social network servers 26. In such implementations, accessing the virtual space through a given social network platform may include logging in to the virtual space through the given social network platform, receiving a view of the virtual space within a user interface associated with the given social network platform (e.g., within a web page hosted by the given social network platform), and/or other mechanisms for accessing the virtual space from the given social network platform.

The users may participate in the virtual space (and/or the online game that takes place therein) by inputting input commands to their respective client computing platforms 14 that request an action to be taken within the instance of the virtual space (e.g., manipulate an object, control a character, speak to another character, and/or other actions). The input commands may be transmitted from client computing platforms 14 to server 12, and received by space module 16. Responsive to reception of the input commands, space module 16 may initiate the requested actions in the instance of the virtual space such that the actions are reflected in the views of the virtual space determined by space module 16.

A virtual space may comprise a simulated space that is accessible by users via clients (e.g., client computing platforms 14) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout. An instance of a virtual space may be persistent. That is, the instance of the virtual space may continue to exist whether or not any given user (or set of users) are currently logged in and/or receiving view information.

The above description of virtual spaces is not intended to be limiting. Space module 16 may be configured to express the virtual space in a more limited, or more rich, manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a given location in a relatively static manner that may or may not include representations of the characters present at the location. Text may be used to express the actions of the characters present at the location (and/or effects of the actions), and/or actions of the characters (and/or effects) may be represented with a relatively limited set of still images and/or short animations. For example, a battle, a meeting, a game, and/or other activities at the given location may be depicted in this manner. Other expressions of individual places within the virtual space are contemplated.

Within the instance of the virtual space (or other virtual environment) executed by space module 16, users may control characters to interact with the virtual space and/or each other. As used herein, the term "character" may refer to an object (or group of objects) present in the virtual space that represents an individual user. The character may be controlled by the user with which it is associated. The characters may move through and interact with the virtual space (e.g., non-player characters in the virtual space, other objects in the virtual space), or the characters may be relatively static visually within views of virtual space. The character representing a given user may be created and/or customized by the given user. The character may have an "inventory" of virtual goods and/or currency that the user can use (e.g., by manipulation of a character or other user controlled element, and/or other items), display, gift, and/or otherwise interact with within the virtual space.

User account module 18 may be configured to manage user accounts associated with individual users. The user accounts may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The information included in the user accounts may include character information. For a given user, the user account may include character information for one or more characters that are associated with the user in the virtual space. The one or more characters may be persistent within the virtual space. The one or more characters may be controllable by the given user in the virtual space. Controlling the one or more characters may enable the given user to advance within the online game (e.g., as the characters progress through the game content available in the virtual space). The given user may be able to control a plurality of the characters within the virtual space simultaneously. The given user may only be able to play one of the characters in the online game in the virtual space at a time. Individual ones of the one or more characters may be unique within the virtual space (e.g., have a unique appearance, a unique name, a unique score or inventory, and/or be unique in other ways). The character(s) for which character information is saved in the user profile of the given user may be exclusive to the given user. That is, the given user may be the only user that controls those character(s). The character information included in the user account for a given character may include one or more of a progress level, a status, a score, an inventory, and/or other information.

The information included in the user accounts may include social network authentication information. Social authentication information for a given user may include authentication information used to log in to a social network platform (e.g., username, password, and/or other authentication information), an identifier or other authentication information assigned to the given user by a social network platform (e.g., without disclosing the authentication information to the given user), an authentication token or key, and/or other authentication information. User account module 18 may be configured such that an individual user may have a user account that includes social network authentication information from a plurality of different social network platforms. This may enable the user to log in to the virtual space (and/or the online game) from any one of the plurality of different social network platforms. This may enhance accessibility to the virtual space (and/or the online game) for the user, in contrast to convention systems in which a user logging in to an online game can only do so from an individual social network platform.

Authentication module 20 may be configured to authenticate users to the virtual space (and/or the online game therein). Authenticating users to the virtual space may include receiving authentication requests, determining whether individual ones of the authentication requests are valid, and logging users into the virtual space (and/or the online game) that have submitted valid authentication requests. A valid authentication request may be an authentication request that includes authentication that is valid for one of the users. Determining whether a given authentication request is valid may include referencing one or more user accounts to determine if authentication information in the given authentication request matches authentication information stored in a user account.

In implementations in which users access the virtual space (and/or the online game therein) through the social network platforms provided by social network servers 26, authentication module 20 may be configured to receive authentication requests that are submitted by users through social network servers 26. These authentication requests may include social network authentication information. By way of example, a social network platform may include a user interface element that is selectable by a user to initiate access to the virtual space (and/or the online game). Responsive to selection of the user interface element on the social network platform, an authentication request may be transmitted to server 12. Authentication module 20 may be configured to receive the authentication request, and to determine whether it is a valid authentication request (e.g., corresponds to a current user of system 10). Responsive to the received authentication request being valid, access to the virtual space (and/or the online game) may be provided to the user. This may include providing views of the virtual space to the user as described herein, and/or facilitating user participation in the online game by controlling one or more characters associated with the user (e.g., one or more characters for which character information is saved in the user account of the user).

Authentication module 20 is configured such that for an individual user, access may be provided responsive requests from a plurality of different social network platforms. Provided authentication information for the plurality of different social network platforms are included in the user account for the individual user, authentication module 20 may be configured to receive an authentication request from any of the plurality of different social network platforms and log the individual user into the virtual space through the same user account. This may provide for persistent and/or consistency for the individual user without regard for the social network platform from which the user was authenticated. For example, progress made in the game during a session initiated through a first social network platform may still be reflected in the user account during a subsequent session initiated through a second social network platform.

Space module 16, user account module 18, and authentication module 20 may be configured such that users that have logged in to the virtual space from different social network platforms can participate in the virtual space (and/or the online game) together. In other words, responsive to a first user logging in to the virtual space to control a first character, and a second user logging in to the virtual space to control a second character, the first user and the second user may be able to participate in the virtual space (and/or the online game) together. This may mean that the first character (under control of the first user) may appear in the views of the virtual space that are presented to the second user, and/or vice versa (e.g., in a synchronous or asynchronous virtual space).

Social network information module 22 may be configured to receive user information from social network servers 26. The social network information may include information about the users gleaned by the social network platforms through their usage. The social network information may include, for example social graph information (indicating friends or links between users in the social network platforms), usage information (e.g., usage frequency, cumulative use, session length, material viewed, posted, or otherwise interacted with), demographic information, education information, and/or other information.

Social network information module 22 may be configured to aggregate social network information for individual users. This aggregation may include, for a given user, aggregating social network information that has the same or similar type across multiple social network platforms. As a non-limiting example, social graph information may be combined across multiple social network platforms to provide a more complete view of the social graph of the given user. This aggregated information may be implemented in providing the virtual space and/or the online game to the user. For example, the aggregated information may be implemented to suggest alliances or other relationships within the virtual space, form groups of characters to participate in the online game together, assess user value or potential user value, and/or customize other aspects of the virtual space (and/or the online game). By using aggregated information from a plurality of different social network platforms for an individual user, system 10 may provide enhanced customization over systems that only use information from a single social network platform.

Notification module 24 may be configured to generate notifications to social network platforms indicating activity by the users in the online game. This may include, responsive to a user performing an action in the online game that triggers a notification, generating notifications of the action to a plurality of social network platforms on which the user has accounts. The notifications may cause an indication of the action to be displayed on walls of the user in the social network platforms. The notifications may provide indications to users of the social network platforms that are linked with the user (e.g., through a friend relationship, through a link, and/or other relationships). The notifications may be selectable by the other users to gain access to the virtual space (and/or the online game). Generating the notifications for the individual user to a plurality of social network platforms may be enabled by the storage by user account module 18 of information related to user accounts of the individual user on the plurality of social network platforms (e.g., social network authentication information and/or other information).

Social network servers 26 may be configured to host a plurality of social network platforms. Social network platforms may include online services or and/or sites that focus on building and reflecting social networks or social relations among people. These services and/or sites may enable users to form connections between each other that signify friendships, kinship, romantic relationships, professional relationships, and/or other relationships. These services and/or sites typically enable communication between users, and may provide individual users with "walls". A user's wall in a social network platform may refer to a set of content that is available for viewing by other users (e.g., users that are linked to the user), and pertains to the user. The content on the user's wall may include content posted by the user, content posted by other users (e.g., users linked to the user), and/or other content. Content from the user's wall may be provided to other users (e.g., in their "feeds") in a broadcast manner.

In some implementations, 12 server, social network servers 26, and/or client computing platforms 14 may be operatively linked via one or more electronic communication links. For example, such electronic communication links may be established, at least in part, via a network such as the Internet and/or other networks.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by space module 16), and to present a view of the virtual game environment (e.g., as described above) based on the received view information. This may facilitate participation by the user of the given client computing platform 14 in the game taking place in the virtual game environment. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 50, one or more processors 52, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 52, information received from server 12, information received from client computing platforms 14, and/or other information that enables server 12 to function as described herein.

Processor(s) 52 is configured to provide information processing capabilities in server 12. As such, processor 52 may include one or more of a digital processor, an analog processor, a digital circuit designed to process information, an analog circuit designed to process information, a state machine, and/or other mechanisms for electronically processing information. Although processor 52 is shown in FIG. 1 as a single entity, this is for illustrative purposes only. In some implementations, processor 52 may include a plurality of processing units. These processing units may be physically located within the same device, or processor 52 may represent processing functionality of a plurality of devices operating in coordination. The processor 52 may be configured to execute modules 16, 18, 20, 22, and/or 24. Processor 52 may be configured to execute modules 16, 18, 20, 22, and/or 24 by software; hardware; firmware; some combination of software, hardware, and/or firmware; and/or other mechanisms for configuring processing capabilities on processor 52.

It should be appreciated that although modules 16, 18, 20, 22, and/or 24 are illustrated in FIG. 1 as being co-located within a single processing unit, in implementations in which processor 52 includes multiple processing units, one or more of modules 16, 18, 20, 22, and/or 24 may be located remotely from the other modules. As a non-limiting example, some or all of the functionality attributed to modules 16, 18, 20, 22, and/or 24 may be provided "in the cloud" by a plurality of processors connected through a network. The description of the functionality provided by the different modules 16, 18, 20, 22, and/or 24 herein is for illustrative purposes, and is not intended to be limiting, as any of modules 16, 18, 20, 22, and/or 24 may provide more or less functionality than is described. For example, one or more of modules 16, 18, 20, 22, and/or 24 may be eliminated, and some or all of its functionality may be provided by other ones of modules 16, 18, 20, 22, and/or 24. As another example, processor 52 may be configured to execute one or more additional modules that may perform some or all of the functionality attributed below to one of modules 16, 18, 20, 22, and/or 24.

It will be appreciated that illustration in FIG. 1 and the description herein of modules 18, 20, 22, and/or 24 being provided for implementation with a single online game and/or virtual space (e.g., provided by space module 16) is not intended to be limiting. In some implementations, one or more of modules 18, 20, 22, and/or 24 may provide the functionality described herein for a plurality of separate online games and/or virtual spaces (e.g., provided by a plurality of space modules). Such implementations may reduce redundancy of an entity that provides a plurality of different online games and/or virtual spaces to users through the social network platforms. In such implementations, the one or more of modules 18, 20, 22, and/or 24 that are provided to serve a plurality of different online games (and/or virtual spaces) may be executed in a separate server from the server(s) executing the space modules.

Figure 2:
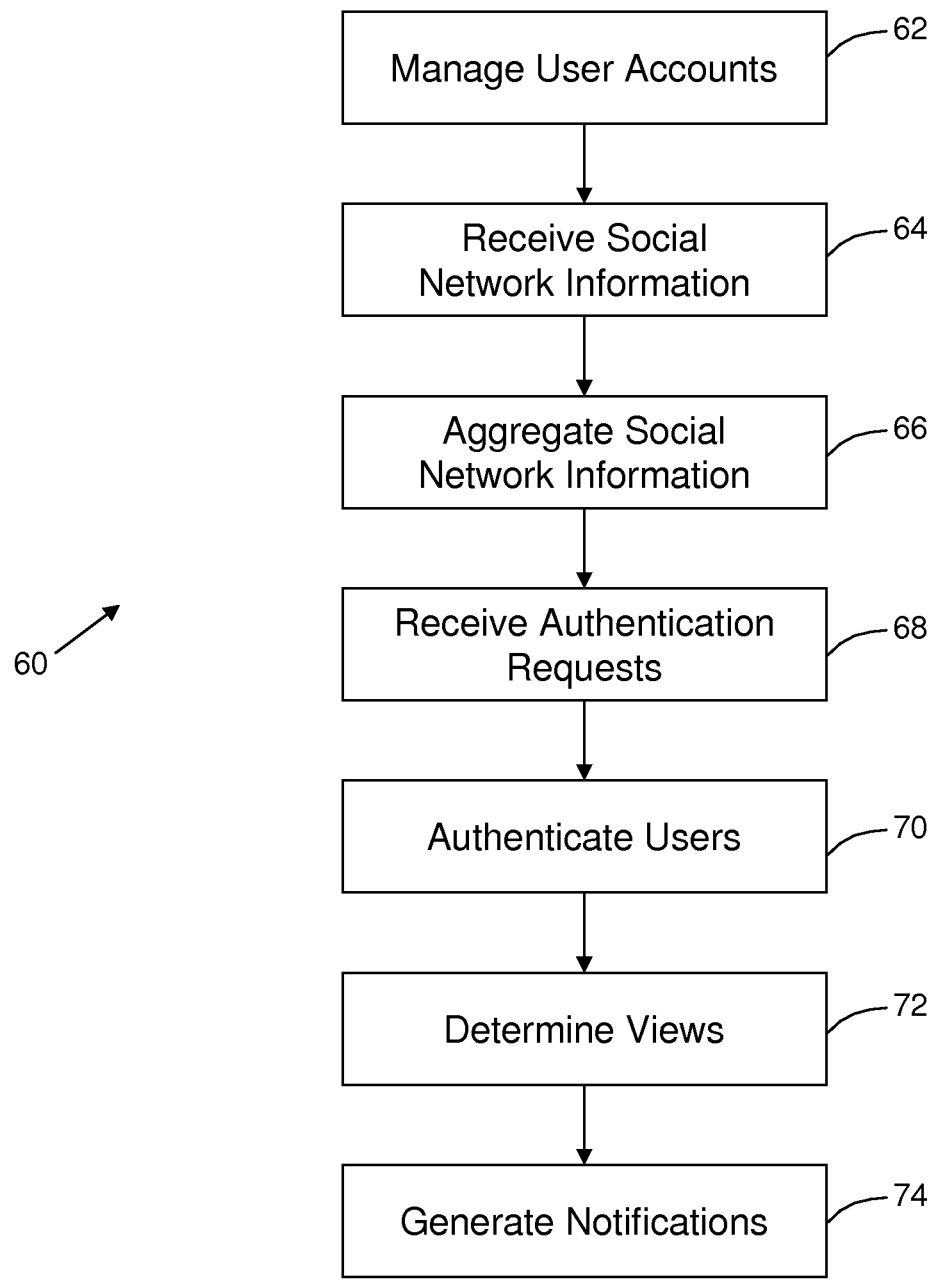
FIG. 2 illustrates a method of providing access of an online game to a user through one of a plurality of social network platforms.

FIG. 2 illustrates a method 60 of providing access of an online game to a user through one of a plurality of social network platforms. Method 60 may include an operation 62. At operation 62, user accounts associated with individual users may be maintained. The user accounts may include user information pertaining to the individual users. The user information may include social network authentication information, character information, and/or other information. The user accounts may include a first user account associated with a first user. The first user account may include a first set of social network authentication information for the first user corresponding to a first social network platform, and a second set of social network authentication information for the second user corresponding to a second social network platform. The first user account may include character information for a first character controlled by the first user in the online game. In some implementations, operation 62 may be performed by user account module the same as or similar to user account module 18 (shown in FIG. 1 and described herein).

At an operation 64, social network information related to the users may be received from social network platforms such that social network information for the first user may be received from the first social network platform and the second social network platform. In some implementations, operation 64 is performed by a social network information module the same as or similar to social network information module 22 (shown in FIG. 1 and described herein).

At an operation 66, social network information for the individual users from different social network platforms may be aggregated such that the social network information for the first user from the first social network platform and the second social network platform having a type that is the same or similar may be aggregated for the first user. The aggregated social network information for the first user may represent the first user across both the first social network platform and the second social network platform. In some implementations, operation 66 is performed by a social network information module the same as or similar to social network information module 22 (shown in FIG. 1 and described herein).

At an operation 68, authentication requests submitted by the users through the social network platforms may be received. The authentication requests may include social network authentication information corresponding to the users that submitted the requests. The received authentication requests may include an authentication request from the first user. The authentication request may have been submitted through either the first social network platform or the second social network platform. In some implementations, operation

68 may be performed by an authentication module the same as or similar to authentication module 20 (shown in FIG. 1 and described above).

At an operation 70, authentication requests submitted by the users may be verified. This may include, responsive to the authentication request from the first user being received through the first social network platform, determining whether the social network authentication information in the authentication request corresponds to the first set of social network authentication information. Responsive to the authentication request from the first user being received through the second social network, operation 70 may include determining whether the social network authentication information in the authentication request corresponds to the second set social network authentication information. At operation 70, responsive to the social network authentication information from the received authentication request corresponding to the appropriate set of social network authentication information in the first user account, the first user may be logged in to the online game to control the first character. In some implementations, operation 70 may be performed by an authentication module the same as or similar to authentication module 20 (shown in FIG. 1 and described above).

At an operation 72, an instance of the virtual space may be executed. The instance of the virtual space may be implemented to determine views of the virtual space that are to be presented to the users of the virtual space. Responsive to the first user being logged in to the online game, the views may include a first view to be presented to the first user. View information defining the first view may be generated and transmitted to a client computing device associated with the first user to facilitate participation in the online game by the first user. In some implementations, operation 72 may be performed by a space module the same as or similar to space module 16 (shown in FIG. 1 and described above).

At an operation 74, notifications may be generated to the social network platforms. The notifications may indicate activity by the users in the online game. At operation 74, responsive to the first user (and/or the first character) performing an action in the online game that triggers a notification, a first notification of the action may be generated for the first social network platform and a second notification of the action may be generated for the second social network platform. The first notification may cause an indication of the action to be displayed on a virtual wall associated with the first user in the first social network platform. The second notification may cause an indication of the action to be displayed on a virtual wall associated with the first user in the second social network platform. In some implementations, operation 74 may be performed by a notification module the same as or similar to notification module 24 (shown in FIG. 1 and described above).

Figure 3:
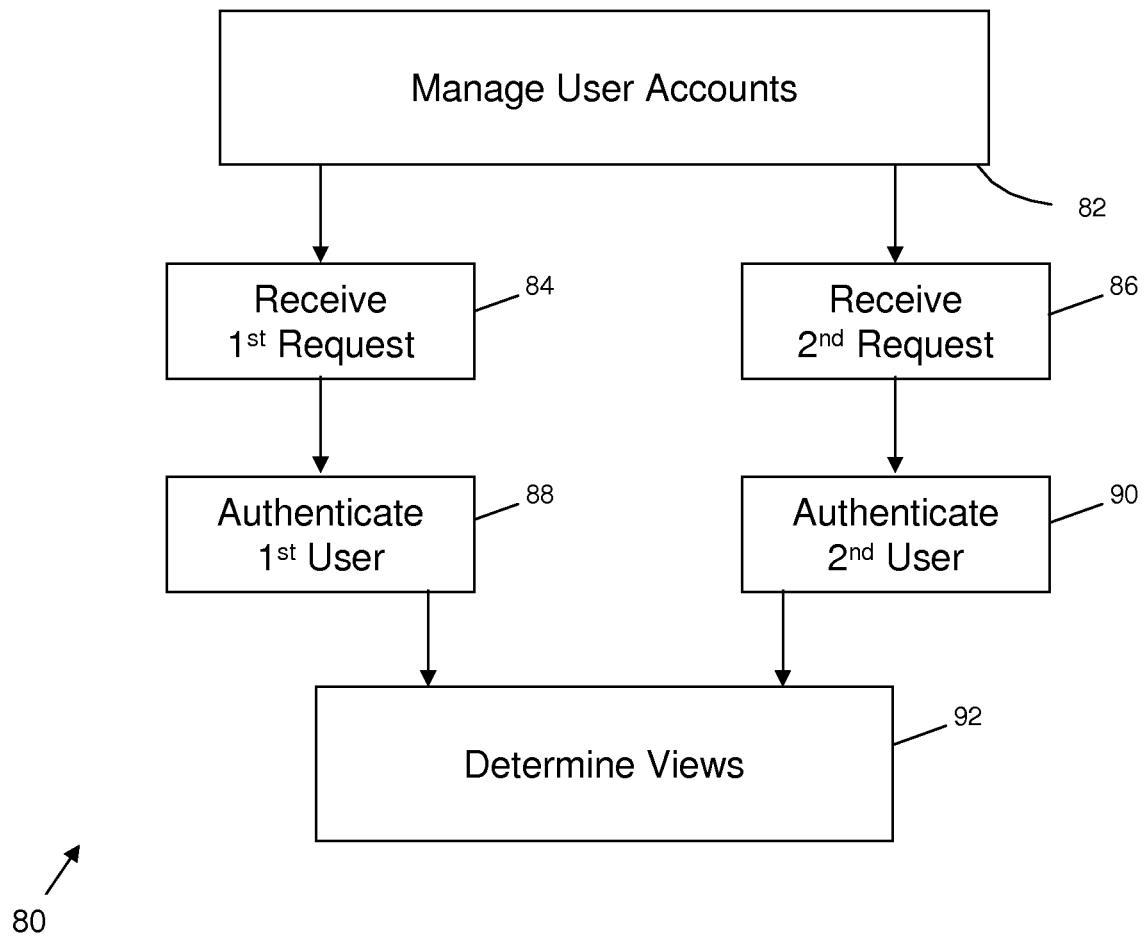
FIG. 3 illustrates a method of facilitating play of an online game through a plurality of social networking platforms

FIG. 3 illustrates a method 80 of facilitating play of an online game through a plurality of social networking platforms. Method 80 may include an operation 82. At operation 82, user accounts associated with individual users may be maintained. The user accounts may include user information pertaining to the individual users. The user information may include social network authentication information, character information, and/or other information. The user accounts may include a first user account associated with a first user, and a second user account associated with a second user. The first user account may include a first set of social network authentication information for the first user corresponding to a first social network platform. The first user account may include character information for a first character controlled by the first user in the online game. The second user account may include a second set of social network authentication information for the second user corresponding to a second social network platform. The second user account may include character information for a second character controlled by the second user in the online game. In some implementations, operation 82 may be performed by user account module the same as or similar to user account module 18 (shown in FIG. 1 and described herein).

At an operation 84, a first authentication request submitted by the first user through the first social network platform may be received. The first authentication request may include the first set of social network authentication information. In some implementations, operation 84 may be performed by an authentication module the same as or similar to authentication module 20 (shown in FIG. 1 and described above).

At an operation 86, a second authentication request submitted by the second user through the second social network platform may be received. The second authentication request may include the second set of social network authentication information. In some implementations, operation 86 may be performed by an authentication module the same as or similar to authentication module 20 (shown in FIG. 1 and described above).

At an operation 88, the first authentication request may be verified. This may include, responsive to reception of the first authentication request, determining whether the social network authentication information in the authentication request corresponds to the first set of social network authentication information. Responsive to the social network authentication information from the first authentication request corresponding to the first set of social network authentication information in the first user account, the first user may be logged in to the online game to control the first character. In some implementations, operation 88 may be performed by an authentication module the same as or similar to authentication module 20 (shown in FIG. 1 and described above).

At an operation 90, the second authentication request may be verified. This may include, responsive to reception of the second authentication request, determining whether the social network authentication information in the authentication request corresponds to the second set of social network authentication information. Responsive to the social network authentication information from the second authentication request corresponding to the second set of social network authentication information in the second user account, the second user may be logged in to the online game to control the second character. In some implementations, operation 88 may be performed by an authentication module the same as or similar to authentication module 20 (shown in FIG. 1 and described above).

At an operation 92, an instance of the virtual space in which the online game takes place may be executed. The instance of the virtual space may be implemented to determine views of the virtual space that are to be presented to the users of the virtual space. Responsive to the first user being logged in to the online game, the views may include a first view to be presented to the first user. View information defining the first view may be generated and transmitted to a client computing device associated with the first user to facilitate participation in the online game by the first user. Responsive to the second user being logged in to the online game, the views may include a second view to be presented to the second user. View information defining the second view may be generated and transmitted to a client computing device associated with the second user to facilitate participation in the online game by the second user. In some implementations, operation 92 may be performed by a space module the same as or similar to space module 16 (shown in FIG. 1 and described above).

The operations of methods 60 and/or 80 presented above are intended to be illustrative. In some embodiments, method 60 and/or method 80 may be accomplished with one or more additional operations not described, and/or without one or more of the operations discussed. Additionally, the order in which the operations of method 60 and/or method 80 are illustrated in FIGS. 2 and 3 and described above is not intended to be limiting.

In some embodiments, method 60 and/or method 80 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 and/or method 80 in response to instructions stored electronically on an electronic storage medium. The one or more processing devices may include one or more devices configured through hardware, firmware, and/or software to be specifically designed for execution of one or more of the operations of method 60 and/or method 80.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate play of an online game through a plurality of social networking platforms, the system comprising:
    one or more processors configured to execute computer program modules, the computer program modules comprising:
        a user account module configured to manage user accounts associated with individual users, the user accounts including a first user account associated with a first user and a second user account associated with a second user, wherein the first user account comprises:
            sets of social network authentication information corresponding to a plurality of social network accounts of the first user on a corresponding plurality of social network platforms, the sets of social network authentication information including a first set of social network authentication information corresponding to a first social network account of the first user on a first social network platform and a second set of social network authentication information corresponding to a second social network account of the first user on a second social network platform; and
            character information for a first character controlled by the first user in the online game; and wherein the second user account comprises:
            sets of social network authentication information corresponding to a plurality of social network accounts of the second user on a corresponding plurality of social network platforms, the sets of social network authentication information including a third set of social network authentication information corresponding to a first social network account of the second user on a first social network platform and a fourth set of social network authentication information corresponding to a second social network account of the second user on a second social network platform; and
            character information for a second character controlled by the second user in the online game; and
        an authentication module configured to receive authentication requests submitted by the users through social network platforms, and to authenticate the users in response to the authentication requests, wherein the authentication module is configured such that:
            responsive to receiving a first authentication request submitted by the first user through the first social network platform, the authentication module identifies the first user based on the inclusion of the first set of social network authentication information in the first authentication request, and logs the first user into the online game to control the first character, and
            responsive to receiving a second authentication request submitted by the second user through the second social network platform, the authentication module identifies the second user based on the inclusions of the fourth set of social network authentication information in the second authentication request, and logs the second user into the online game to control the second character, such that the first user and the second user may participate in the online game together.

2. The system of claim 1, wherein the computer program modules further comprise a space module configured to execute an instance of a virtual space in which the online game is played, and wherein the space module is configured such that responsive to the first user and the second user being logged into the online game by the authentication module, the space module (i) implements the instance of the virtual space to determine a first set of view information that defines a first view of the virtual space for presentation to the first user and a second set of view information that defines a second view of the virtual space for presentation to the second user, and (ii) transmits the view information to a client computing platform associated with the first user and to the client computing platform associated with the second user to facilitate presentation of the first view of the virtual space to the first user and the second view to the second user on the client computing platforms.

3. The system of claim 1, wherein the character information includes one or more of information that defines a visual appearance of the character, a progress level of the character in the online game, a status of the character in the online game, a score of the character in the online game, or an inventory of the character in the online game.

4. The system of claim 1, wherein the computer program modules further comprise a social network information module configured to receive user information from the social network platforms about the users such that user information about the first user and user information about the second user is received from the first social network platform and from the second social network platform.

5. The system of claim 4, wherein the social network information module is configured to aggregate user information for the individual users that is received from the different social network platforms such that the user information about the first user received from the first social network platform and the second social network platform and the user information about the second user received from the first social network platform and the second social network platform having a type that is the same or similar is aggregated for the first user and second user to represent the first user and the second user across both the first social network platform and the second social network platform.

6. The system of claim 1, wherein the computer program modules further comprise a notification module configured to generate notifications to the social network platforms indicating activity by the users in the online game such that responsive to the first user performing an action in the online game that triggers a notification, the notification module is configured to generate a first notification of the action for the first social network platform and a second notification of the action for the second social network platform.

7. The system of claim 6, wherein the notification module is configured such that the first notification causes an indication of the action to be displayed on a virtual wall associated with the first user in the first social network platform, and such that the second notification causes an indication of the action to be displayed on a virtual wall associated with the first user in the second social network platform.

8. A computer-implemented method of facilitating play of an online game through a plurality of social networking platforms, the method being implemented in one or more processors configured to execute computer program modules, the method comprising:
    managing user accounts associated with individual users, the user accounts including a first user account associated with a first user and a second user account associated with a second user, wherein the first user account comprises:
        sets of social network authentication information corresponding to a plurality of social network accounts of the first user on a corresponding plurality of social network platforms, the sets of social network authentication information including a first set of social network authentication information corresponding to a first social network account of the first user on a first social network platform and a second set of social network authentication information corresponding to a second social network account of the first user on a second social network platform; and
        character information for a first character controlled by the first user in the online game; and wherein the second user account comprises:
        sets of social network authentication information corresponding to a plurality of social network accounts of the second user on a corresponding plurality of social network platforms, the sets of social network authentication information including a third set of social network authentication information corresponding to a first social network account of the second user on a first social network platform and a fourth set of social network authentication information corresponding to a second social network account of the second user on a second social network platform; and
        character information for a second character controlled by the second user in the online game; and
    receiving authentication requests submitted by the users through social network platforms;
    authenticating the users in response to the authentication requests such that:
        responsive to receiving a first authentication request submitted by the first user through the first social network platform, identifying the first user based on the inclusion of the first set of social network authentication information in the first authentication request, and logs the first user into the online game to control the first character, and
        responsive to receiving a second authentication request submitted by the second user through the second social network platform, identifying the second user based on the inclusions of the fourth set of social network authentication information in the second authentication request, and logs the second user into the online game to control the second character, such that the first user and the second user may participate in the online game together.

9. The method of claim 8, further comprising:
executing an instance of a virtual space in which the online game is played;
responsive to the first user and the second user being logged into the online game, implementing the instance of the virtual space to determine view information that defines a first view of the virtual space for presentation to the first user and a second view of the virtual space for presentation to the second user; and
transmitting the view information to a client computing platform associated with the first user and the client computing platform associated with the second user to facilitate presentation of the first view of the virtual space to the first user and the second view of the virtual space to the second user on the client computing platform.

10. The method of claim 8, wherein the character information includes one or more of information that defines a visual appearance of the character, a progress level of the character in the online game, a status of the character in the online game, a score of the character in the online game, or an inventory of the character in the online game.

11. The method of claim 8, further comprising receiving user information from the social network platforms about the users such that user information about the first user and the second user is received from the first social network platform and from the second social network platform.

12. The method of claim 11, further comprising aggregating user information for the individual users that is received from the different social network platforms such that the user information about the first user received from the first social network platform and the second social network platform and user information about the second user received from the first social network platform and the second social network platform having a type that is the same or similar is aggregated for the first user and aggregated for the second user to represent the first user and the second user across both the first social network platform and the second social network platform.

13. The method of claim 8, further comprising generating notifications to the social network platforms indicating activity by the users in the online game such that responsive to the first user performing an action in the online game that triggers a notification, a first notification of the action is generated for the first social network platform and a second notification of the action generated for the second social network platform.

14. The method of claim 13, wherein the first notification causes an indication of the action to be displayed on a virtual wall associated with the first user in the first social network platform, and wherein the second notification causes an indication of the action to be displayed on a virtual wall associated with the first user in the second social network platform.

15. A system configured to facilitate play of an online game through a plurality of social networking platforms, the system comprising:

one or more processors configured to execute computer program modules, the computer program modules comprising:

an authentication module configured to receive authentication requests submitted by the users through social network platforms, and to authenticate the users in response to the authentication requests, wherein the authentication module is configured such that:

responsive to receiving a first valid authentication request submitted by a first user through a first social network platform, the authentication module logs the first user into the online game to control a first character associated with the first user, and responsive to receiving a second valid authentication request submitted by a second user through a second social network platform, the authentication module logs the second user into the online game to control a second character associated with the second character; and a space module configured to execute an instance of a virtual space in which the online game is played, and wherein the space module is configured such that responsive to the first user and the second user being logged into the online game by the authentication module, the space module (i) implements the instance of the virtual space to determine view information that defines a first view of the virtual space for presentation to the first user, and a second view of the virtual space for presentation to the second user, and (ii) transmits the view information to client computing platforms associated with the first user and the second user to facilitate presentation of the first view to the first user, and of the second view to the second user, wherein the first character under control of the first user is viewable in the second view, and wherein the second character under control of the second user is viewable in the first view.

16. The system of claim 15, wherein the computer program modules comprise a user account module configured to manage user accounts associated with individual users, the user accounts comprising:

a first user account associated with the first user that includes character information for the first character, and a second user account associated with the second user that includes character information for the second character.

17. The system of claim 16, wherein the character information includes one or more of information that defines a visual appearance of a character, a progress level of a character in the online game, a status of a character in the online game, a score of a character in the online game, or an inventory of a character in the online game.

18. The system of claim 15, wherein the space module is configured such that the instance of the virtual space is synchronous for the first user and the second user such that user controlled actions performed by the first character are reflected in the second view in real time or near real time.

* * * * *